United States Patent [19]

Matsumoto

[11] Patent Number: 5,170,302
[45] Date of Patent: Dec. 8, 1992

[54] THIN-FILM MAGNETIC HEAD WITH MULTIPLE INTERCONNECTED COIL LAYERS

[75] Inventor: Toshio Matsumoto, Kanagawa, Japan

[73] Assignee: Mitsubishi Denki Kabushiki Kaisha, Japan

[21] Appl. No.: 693,794

[22] Filed: Apr. 30, 1991

[30] Foreign Application Priority Data

May 7, 1990 [JP] Japan .................. 2-117074

[51] Int. Cl.⁵ .............................................. G11B 5/17
[52] U.S. Cl. .................................... 360/123; 360/126
[58] Field of Search ............................... 360/123, 126

[56] References Cited

U.S. PATENT DOCUMENTS

| | | | |
|---|---|---|---|
| 4,639,811 | 1/1987 | Diepes et al. | 360/123 X |
| 4,694,368 | 9/1987 | Bischoff et al. | 360/123 X |
| 4,713,711 | 12/1987 | Jones, Jr. et al. | 360/123 |
| 5,047,886 | 9/1991 | Toyoda et al. | 360/126 |

FOREIGN PATENT DOCUMENTS 0213687  3/1987  European Pat. Off. .
0255523  11/1986  Japan .
0063114  3/1988  Japan .

*Primary Examiner*—David J. Severin
*Attorney, Agent, or Firm*—Wolf, Greenfield & Sacks

[57] ABSTRACT

A thin-film magnetic head comprising four or more conductive coil layers each wound spirally and alternately piled up so as to form a lamination structure. The conductive coil layers are divided into first and second groups so that the total number of turns of the conductive coil layers in the first group becomes equal to the total number of turns of the conductive layers in the second group. The conductive coil layers in the first group are coupled in series to each other and the conductive coil layers in the second group are also coupled in series to each other, the first and second groups being coupled in series to each other and a center tap being provided between the first and second groups.

5 Claims, 7 Drawing Sheets

THIN-FILM MAGNETIC HEAD WITH MULTIPLE INTERCONNECTED COIL LAYERS

BACKGROUND OF THE INVENTION

1. Field of the Invention

The present invention relates generally to thin-film magnetic heads for use in magnetic disk apparatus, and more particularly to such a thin-film magnetic head having four or more conductive coil layers.

2. Description of the Prior Art

In order to meet the requirement of high-density recording of information, the track width of a magnetic head is being narrowed increasingly. On the other hand, in response to the track width being narrowed to decrease the output, the thin-film magnetic head is arranged so as to be equipped with a plurality of conductive coil layers to increase the number of turns in the winding to enlarge its output and to be provided with a center tap for the winding to counter increase in the inductance accompanying the increase in the number of turns. For instance, as illustrated in FIG. 9, such a thin-film magnetic head is arranged such that insulating layers 3 made of an organic insulating material and conductive coil layers 4 are provided between a lower magnetic pole 1 and an upper magnetic pole 2 to be alternately piled up so as to form a laminated body which is placed on a base 6 with a gap member 5 being interposed therebetween.

A further description will be made hereinbelow in terms of the insulating layers 3 and the conductive coil layers 4. On the upper surface of the gap member 5 there is placed the first insulating layer 3a, and on the upper surface of the first insulating layer 3a there is disposed the first conductive coil layer 4a. Further, successively piled up are the second insulating layer 3b, second conductive coil layer 4b, third insulating layer 3c, third conductive coil layer 4c, fourth insulating layer 3d, fourth conductive coil layer 4d and fifth insulating layer 3e. The lower magnetic pole 1, conductive coil layers 4a to 4d and upper magnetic pole 2 are respectively insulated by means of the first to fifth insulating layers 3a to 3e. In addition, although not illustrated, the first conductive coil layer 4a and second conductive coil layer 4b, the second conductive coil layer 4b and third conductive coil layer 4c, and the third conductive coil layer 4c and fourth conductive coil layer 4d are at their end portions coupled to each other, respectively. Moreover, a center tap is drawn from the connection point between the second and third conductive coil layers 4b and 4c, and lead lines are respectively provided at the other end portions of the first and fourth conductive coil layers 4a and 4d.

Here, for the thin-film magnetic head having the center tap, since two coil portions divided by the center tap are required to be coincident in resistance and inductance with each other (see the Japanese Patent Laid-Open Publication Nos. 61-255523 and 63-63114), the conductive coil section comprising the first and second conductive coil layers 4a, 4b and the conductive coil section comprising the third and fourth conductive coil layers 4c, 4d are generally arranged so as to be equal in the number of turns in the coil and the width of the coil to each other. In addition, when piling up the respective conductive coil layers, a height difference appears with respect to the circumference, and because limitation is imposed upon the mask engraving on manufacturing, the respective peripheral ends of the conductive coil layers 4a to 4d and the insulating layers 3a to 3e are required to be successively reduced from the lower layer to the upper layer so as to incline the circumferential surface as a whole, thus more decreasing the coil pitch of the conductive coil layer as the position becomes higher.

There is a problem which arises such a conventional thin-film magnetic head, however, in that, as the number of the coil layers increases, the height difference increasingly enlarges with respect to the peripheral portions so as to make severer the engraving condition. Moreover, the coil pitch become smaller as the position becomes higher to reduce the space between the coils. This also make more difficult the engraving.

Although the Japanese Patent Laid-Open Publication No. 63-63114 discloses a multilayer balance-winding thin-film magnetic head where the respective coil layers are formed by a bifilar and a midpoint terminal is provided so that two coil sections are coincident in the number of turns and the width of the coil with each other and steps disappears at the circumferential end portions of the coil layer and the insulating layer, since in this magnetic head two conductive coils are simultaneously provided in parallel to each other by the bifilar, the outside length becomes greater than the inside length and hence the resistance of the outside conductive coil section becomes higher, whereby the electromagnetic characteristics of the two conductive coil sections divided by the midpoint terminal becomes unbalanced.

SUMMARY OF THE INVENTION

The present invention is for eliminating the above-described problems and contemplates to provide a thin-film magnetic head which is capable of not only enlarging the coil pitch irrespective of an upper layer portion to make easy the engraving but also equalizing the resistance and inductance of two coil sections divided by a center tap.

According to the present invention, all of the conductive coil layers are divided or classified into first and second groups so that the sum of the numbers of turns of the conductive coil layers in the first group becomes equal to the sum of the numbers of turns of the conductive coil layer in the second group, and the conductive coil layers in the first group are coupled in series to each other and the conductive coil layers in the second group are also coupled in series to each other, and the first and second groups are coupled in series to each other, and further a center tap is provided between the first and second groups.

The above and other objects, features, and advantages of the invention will become more apparent from the following description when taken in conjunction with the accompanying drawings.

DESCRIPTION OF THE PREFERRED EMBODIMENT

Figure 1:
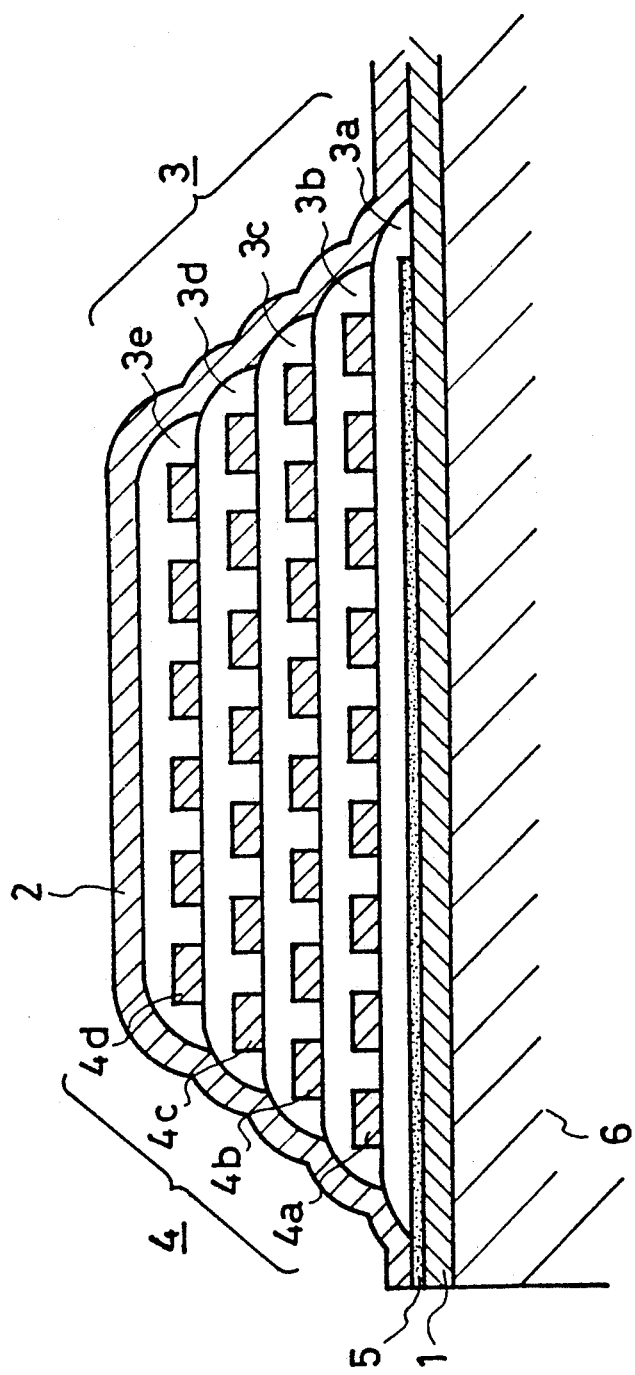
FIG. 1 is a cross-sectional view showing a principal portion of an embodiment of a thin-film magnetic head according to the present invention.
Figure 2:
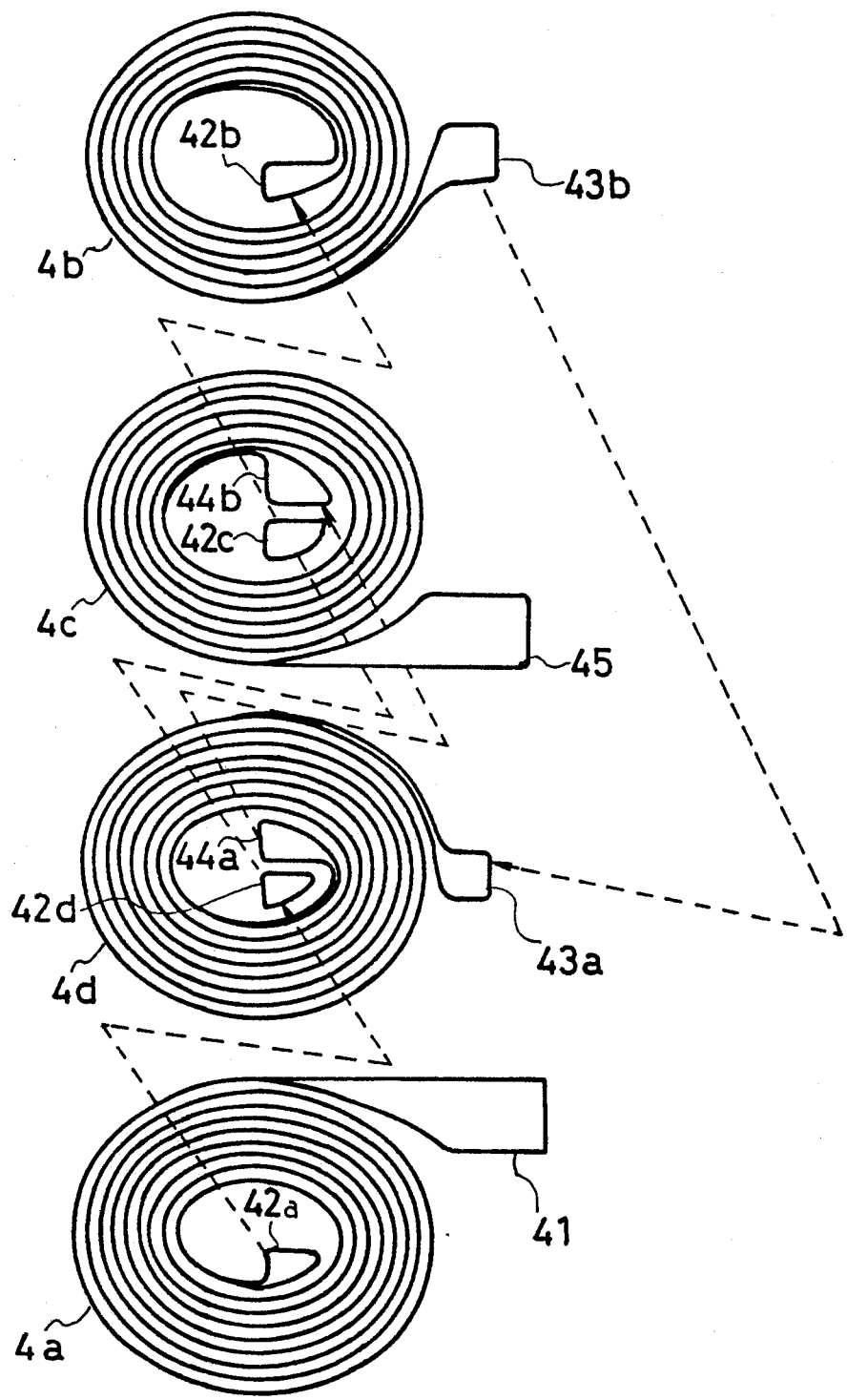
FIGS. 2 and 3 are illustrations of conductive film patterns of the respective conductive coil layers of the thin-film magnetic head shown in FIG. 1, FIGS. 4 to 8 are illustrations of another embodiment of a thin-film magnetic head according to this invention.
Figure 3:
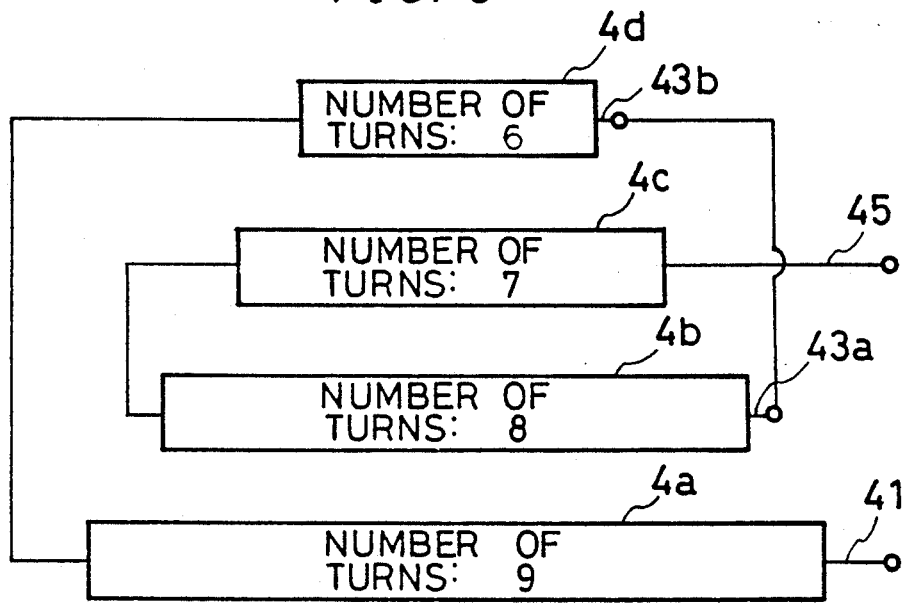
Figure 9:
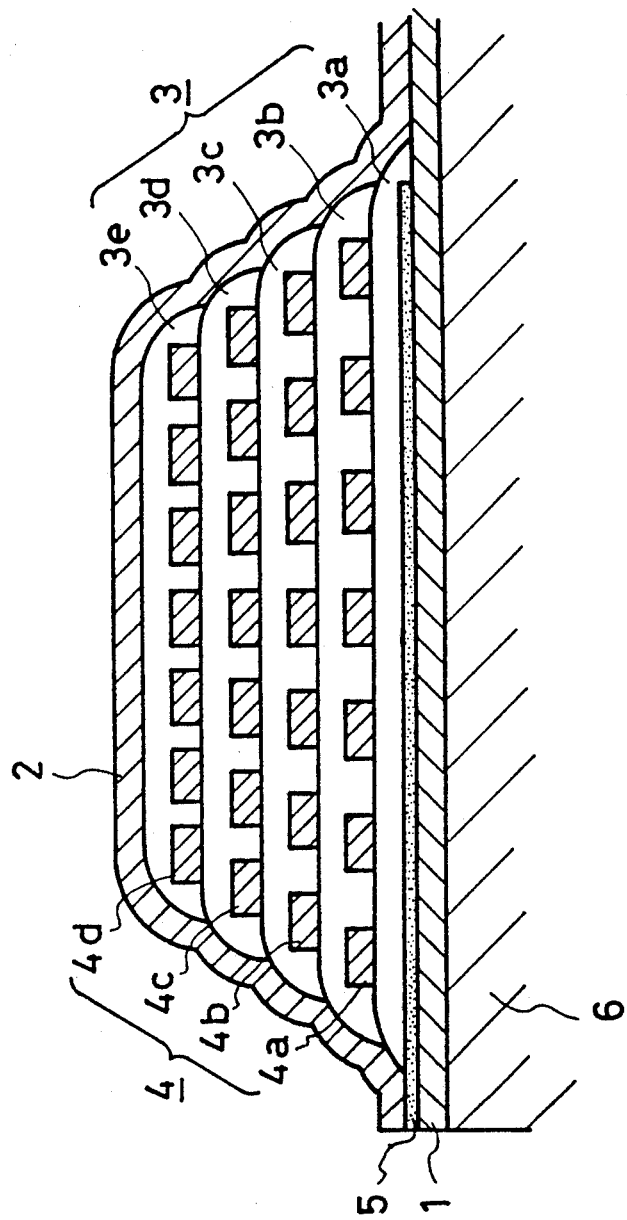
FIG. 9 shows a conventional thin-film magnetic head.

The present invention will first be described with reference to an embodiment illustrated in FIGS. 1 to 3 where parts corresponding to those in FIG. 9 showing the conventional thin-film magnetic head are indicated by the same marks. The description thereof will be made principally in terms of its feature. FIG. 1 is a cross-sectional view showing a principal portion of the embodiment of a thin-film magnetic head according to this invention, and FIG. 2 illustrates conductive film patterns of the respective conductive coil layers constituting the FIG. 1 thin-film magnetic head where dotted lines and arrows represent the connection state. FIG. 3 is an illustration useful for a better understanding of the connection state.

As illustrated in FIGS. 1 to 3, the thin-film magnetic head of this embodiment is arranged such that between a lower magnetic pole and an upper magnetic pole are provided insulating layers 3 made of an organic insulating material and conductive coil layers 4 which are alternately laminated. These lower magnetic pole 1, insulating layers 3 conductive coil layers 4 and upper magnetic pole 2 are placed on a base 6 with a gap member 5 being interposed therebetween. For formation, each of the first to fourth conductive coil layers 4a to 4d is wound spirally and placed on a flat portion of the upper surface of each of the insulating layers 3a to 3d. In this case, the numbers of turns of the respective coils are arranged to be different from each other, that is, the numbers of turns thereof are 9, 8, 7 and 6 in order from the lower layers. Further, the lower magnetic pole 1, conductive coil layers 4a to 4d and upper magnetic pole 2 are insulated by means of the respective insulating layers 3a to 3e, respectively.

Although not illustrated, the respective conductive coils between the first and fourth conductive coil layers 4a and 4d, the fourth and second conductive coil layers 4d and 4b and the second and third conductive coil layers 4b and 4c are at their end portions coupled to each other, and a center tap is led from the connection portion between the second and fourth conductive coil layers 4b and 4d and a lead wire is led from the non-connected end portion between the first to third conductive coil layers 4a and 4c.

A further description will be made hereinbelow in terms of the above-mentioned conductive coil layers 4a to 4d with reference to FIGS. 2 and 3. The respective conductive coil layers 4a to 4d are formed with conductive films having patterns as illustrated in FIG. 2. That is, in the first conductive coil layer 4a, a lead wire 41 is formed at an outer end portion of the coil and a connection portion 42a to the fourth conductive coil layer 4d is formed at an inner end portion of the coil. In the second conductive coil layer 4b, a lead wire 43a which is a connection portion to the fourth conductive coil layer 4d and further to the center tap is formed at an outer end portion of the coil and a connection portion 44a to the third conductive coil layer 4c is formed at an inner end portion of the coil. Further, in the third conductive coil layer 4c, a lead wire 45 is disposed at an outer end portion of the coil and a connection portion 44b to the second conductive coil layer 4b is disposed at an inner end portion of the coil. Still further, in the fourth conductive coil layer 4d, a lead wire 43b which is a connection portion to the second conductive coil layer 4b and further to the center tap is provided at an outer end portion of the coil and a connection portion 42d to the first conductive coil layer 4a is provided at an inner end portion of the coil. In addition, near the connection portions 44a and 44b of the respective inner end portions of the second and third conductive coil layers 4b and 4c, there are formed connection portions 42b and 42c for coupling the connection portion 42a of the inner end portion in the first conductive coil layer 4a to the connection portion 42d of the inner end portion in the fourth conductive coil layer 4d. That is, the first and fourth conductive coil layers 4a and 4d not adjacent to each other but opposed to each other with the conductive coil layers 4b and 4c being interposed therebetween are in series coupled to each other so as to form the first group, and remaining second and third conductive coil layers 4b and 4c are in series coupled to each other so as to form the second group. The first and second groups are in series coupled to each other through the lead wires 43a and 43b. In this case, the total number of turns of the coils of the conductive coil layers 4a and 4d in the first group is 15 and the total number of turns of the coils of the conductive coil layers 4b and 4c is 15. They are equal to each other.

In the thin-film magnetic head thus arranged, the total number of turns is 30, while the center tap causes division into first and second group coil sections, the first group coil section comprising the first and fourth conductive coil layers 4a and 4d and the second group coil section comprising the second and third conductive coil layers 4b and 4c. In the former the number of turns is 15 and in the latter the number of turns is 15, the former being equal in the number of turns to the latter. That is, with the center tap being provided between the first and second groups, they become coincident in resistance and inductance with each other. Accordingly, according to this embodiment, the numbers of turns of the first to fourth conductive coil layers 4a to 4d can be successively reduced so as to be 9, 8, 7 and 6 in order from the lower layer toward the upper layer. As a result, even in the case of the upper layer, the number of turns thereof is relatively large so that the coil pitch is not required to be narrowed, thereby allowing easy mask engraving.

Figure 4:
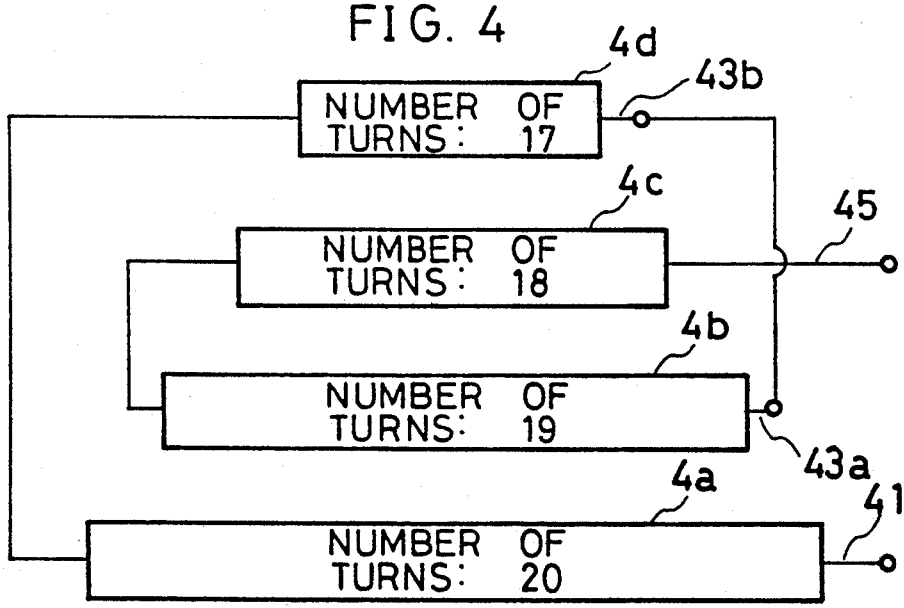
Figure 5:
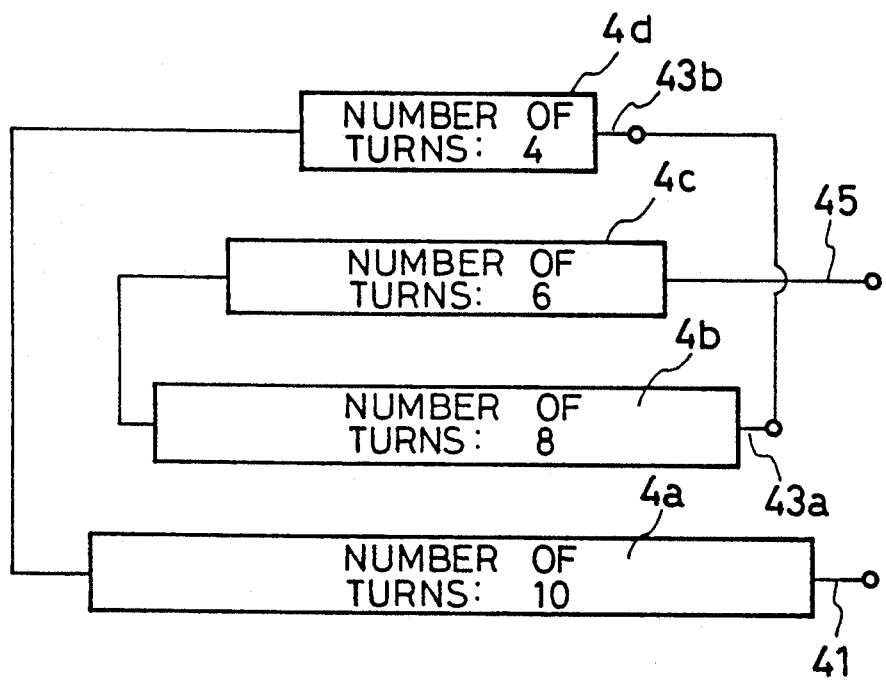
Figure 6:
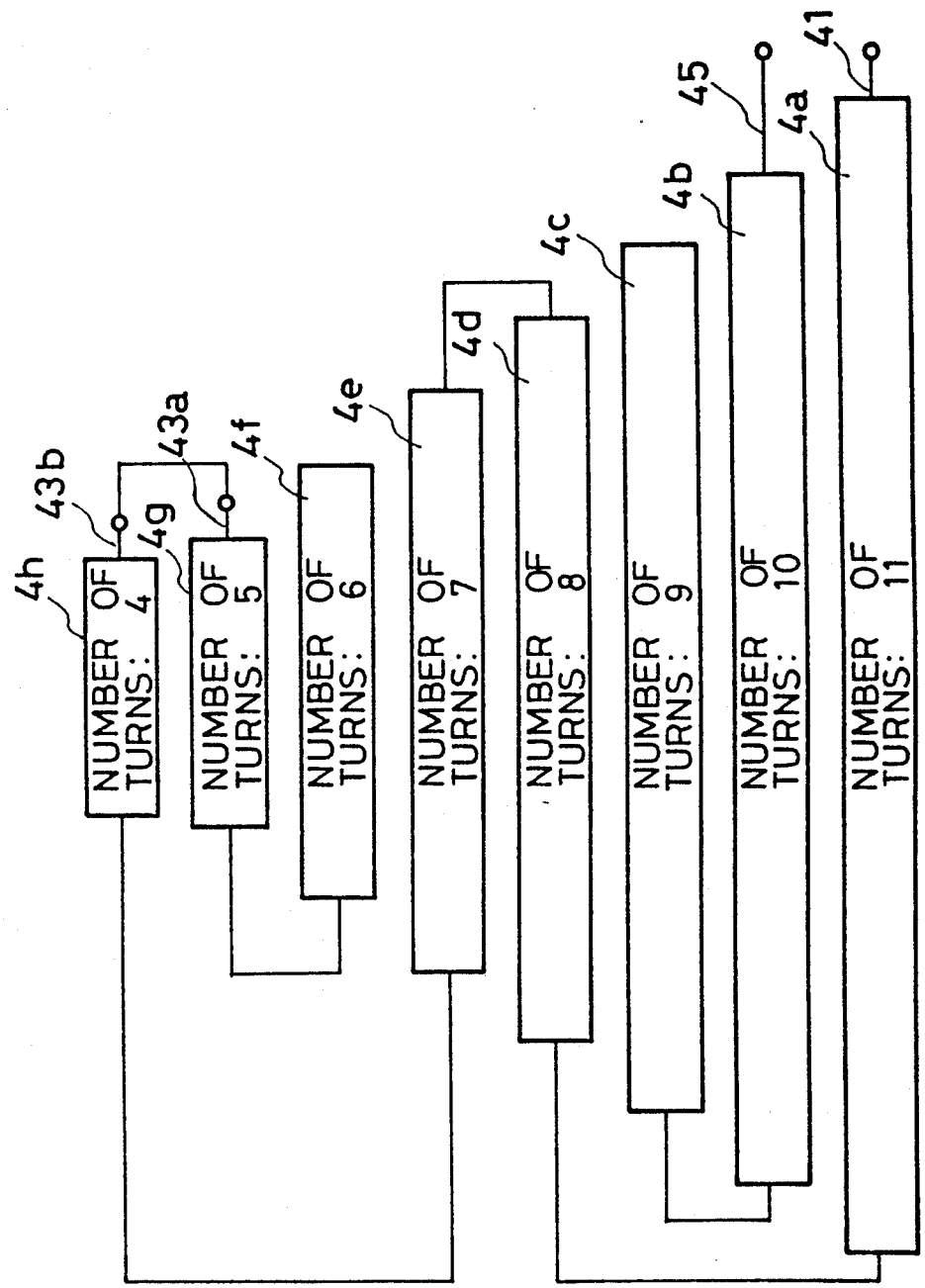
Figure 8:
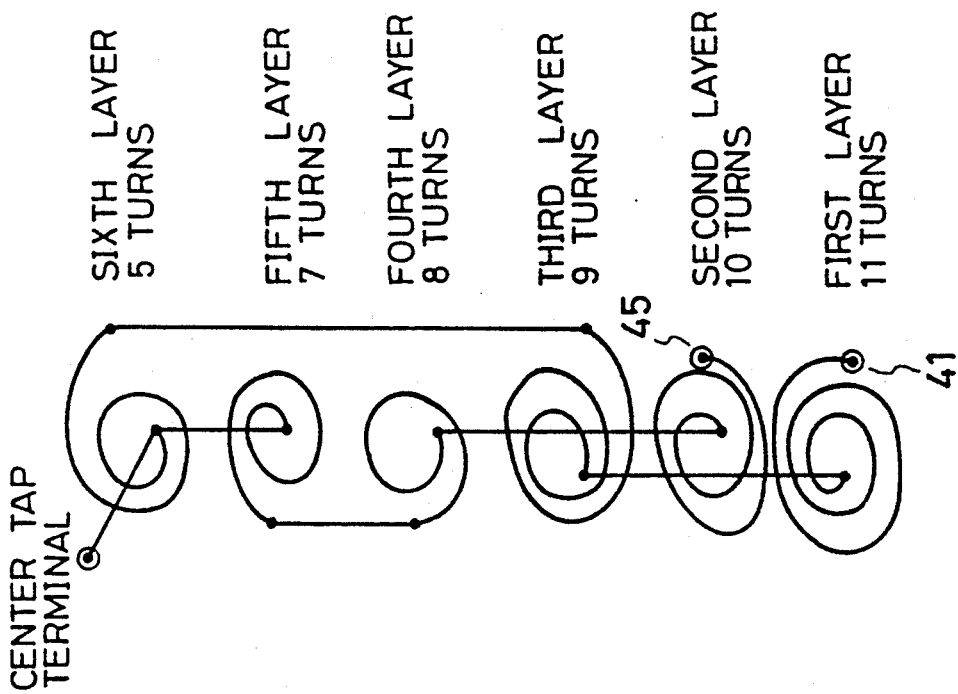
Figure 7:
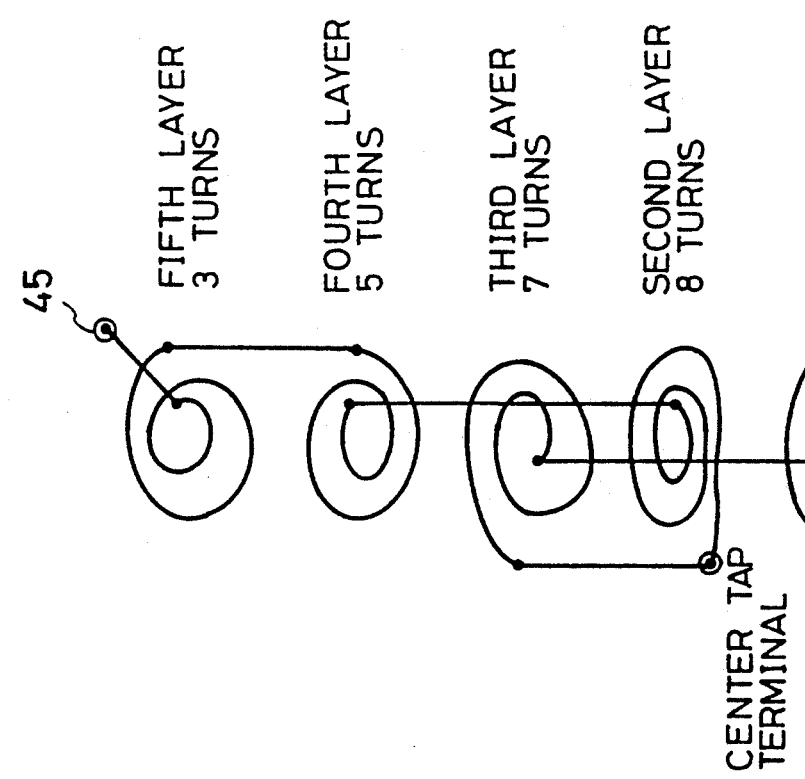

Here, if in the first to fourth conductive coil layers 4a to 4d the numbers of turns are successively reduced by one toward the upper layer as illustrated in FIG. 4, the same effect can be achieved. Further, even if successively reduced by two or more toward the upper layer as illustrated in FIG. 5, the same advantage can be obtained. Still further, even if the number of the conductive coil layers is 8 as shown in FIG. 6, the same effect can be obtained with the similar connection. In addition, even if the number of turns irregularly varies toward the upper layer as shown in FIGS. 7 and 8, the same advantage can be achieved with the similar connection technique. In FIGS. 7 and 8, the numbers of conductive coil layers are 5 and 6 and the connection systems are arranged to be different from those in FIGS. 3 to 6.

For all of the conductive coil layers, the coil pitches and spaces between the coils are not always required to be equal to each other. By taking into account the ease of the coil engraving, it is possible to determine the coil pitchs to be more enlarged toward the upper layer. Further, it is possible to suitably determine the form and position of the center tap, lead wires and connection portions.

According to this invention, since the upper conductive coil layer can be arranged to have a coil pitch substantially equal to that of the lower conductive coil layer or the coil pitch can be gradually increased toward the upper layer, it is possible to provide a thin-film magnetic head which is easy in engraving concurrently with equalizing the resistances and inductances of the coil sections to be divided by the center tap.

What is claimed is:

1. A thin-film magnetic head comprising five or more insulating layers and four or more conductive coil layers placed between a lower magnetic pole and an upper magnetic pole and alternately piled up so as to form a lamination structure, said conductive coil layers being respectively would spirally and placed on surfaces of said insulating layers, characterized in that the number of turns of said conductive coil layers is reduced toward the upper layer, said conductive coil layers are divided into first and second groups so that the total number of turns of the conductive coil layers in said first group becomes equal to the total number of turns of the conductive layers in said second group, the conductive coil layers in said first group are coupled in series to each other and the conductive coil layers in said second group are coupled in series to each other, said first and second groups being coupled in series to each other and a center tap being provided between said first and second groups.

2. A thin-film magnetic head as claimed in claim 1, characterized in that the conductive coil layers in said first or second group are arranged such that one i in series coupled to the other with the conductive coil layer adjacent thereto being jumped over.

3. A thin-film magnetic head as claimed in claim 1, characterized in that the number of turns of coils in said conductive coil layers i successively decreased by one or a predetermined number toward the upper layer.

4. A thin-film magnetic head as claimed in claim 1, characterized in that the number of turns in coils of said conductive coil layers is irregularly decreased toward the upper layer.

5. A thin-film magnetic head as claimed in claim 1, characterized in that the coil pitches in the conductive coil layers are substantially equal to each other or changed to be greater toward the upper layer.

* * * * *